US011304029B1

(12) United States Patent
Kaiser et al.

(10) Patent No.: US 11,304,029 B1
(45) Date of Patent: *Apr. 12, 2022

(54) LOCATION BASED MOBILE DEVICE SYSTEM AND APPLICATION FOR PROVIDING ARTIFACT TOURS

(71) Applicant: George Kaiser Family Foundation, Tulsa, OK (US)

(72) Inventors: George B Kaiser, Tulsa, OK (US); Stanton Doyle, Tulsa, OK (US)

(73) Assignee: George Kaiser Family Foundation, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,108

(22) Filed: Dec. 10, 2020

Related U.S. Application Data

(60) Continuation of application No. 16/264,472, filed on Jan. 31, 2019, now abandoned, which is a division of application No. 14/726,550, filed on May 31, 2015, now Pat. No. 10,244,349.

(60) Provisional application No. 62/005,742, filed on May 30, 2014.

(51) Int. Cl.
| | |
|---|---|
| *H04W 4/021* | (2018.01) |
| *G06Q 50/14* | (2012.01) |
| *H04W 4/02* | (2018.01) |
| *G06Q 10/02* | (2012.01) |
| *H04W 4/024* | (2018.01) |

(52) U.S. Cl.
CPC .......... *H04W 4/021* (2013.01); *G06Q 10/02* (2013.01); *G06Q 50/14* (2013.01); *H04W 4/027* (2013.01)

(58) Field of Classification Search
CPC ...... H04W 4/021; H04W 4/027; G06Q 10/02; G06Q 50/14
USPC .......................................................... 705/5
See application file for complete search history.

(56) References Cited

U.S. PATENT DOCUMENTS

| | | | |
|---|---|---|---|
| 9,307,378 B2 * | 4/2016 | Johansson | H04W 4/024 |
| 2011/0213549 A1 * | 9/2011 | Hallas | G01C 21/20 |
| | | | 701/533 |
| 2015/0332494 A1 * | 11/2015 | Furukawa | G06T 15/005 |
| | | | 345/419 |

* cited by examiner

*Primary Examiner* — Garcia Ade
(74) *Attorney, Agent, or Firm* — Frederic Dorwart, Lawyers PLLC; Penina Michlin Chiu

(57) ABSTRACT

A location based mobile device system and application for providing artifact tours is described. The mobile device application of illustrative embodiments provides multimedia information regarding an array of artifacts pertinent to the location of the mobile device. The artifacts include both current and historical events, in addition to landmarks, architecture, famous persons associated with the location, natural phenomenon and age-based activities. Illustrative embodiments generate tours that connect artifacts by common theme and the current location of the mobile device. Information relevant to a particular location may be displayed or pushed on the mobile device unprompted when the device passes in proximity to a Bluetooth beacon.

20 Claims, 16 Drawing Sheets

LOCATION BASED MOBILE DEVICE SYSTEM AND APPLICATION FOR PROVIDING ARTIFACT TOURS

CROSS REFERENCE TO RELATED APPLICATIONS

This application is a continuation of U.S. application Ser. No. 16/264,472 to Kaiser et al., filed Jan. 31, 2019, and entitled "LOCATION BASED MOBILE DEVICE SYSTEM AND APPLICATION FOR PROVIDING ARTIFACT TOURS," which is a divisional of U.S. application Ser. No. 14/726,550 to Kaiser et al., filed May 31, 2015 and entitled "LOCATION BASED MOBILE DEVICE SYSTEM AND APPLICATION FOR PROVIDING ARTIFACT TOURS," which issued as U.S. Pat. No. 10,244,349 issued on Mar. 26, 2019, which claims the benefit of U.S. Provisional Application No. 62/005,742 to Kaiser et al., filed May 30, 2014 and entitled "LOCATION BASED MOBILE DEVICE APPLICATION FOR PROVIDING ARTIFACT TOURS," each of which are hereby incorporated by reference in their entirety.

BACKGROUND OF THE INVENTION

1. Field of the Invention

Embodiments of the invention described herein pertain to the field of software applications for mobile devices. More particularly, but not by way of limitation, one or more embodiments of the invention enable a location based mobile device system and application for providing artifact tours.

2. Description of the Related Art

Visitors and residents of neighborhoods are often unaware of local points of interest, historical sites or historical events that have taken place in the locality, current events of interest, and options for restaurants and entertainment. Traditionally, bronze plaques may sometimes be placed in front of a historical site to inform passersby of the significance of the site. More recently, it has been proposed that smart phone applications (Apps) can provide information to visitors about historical sites. However, visitors to a city or neighborhood may desire information regarding current events in a geographic area and/or may desire an interactive audiovisual experience when visiting or spending time in a location—such as local music, photographs of indigenous plants or famous residents—in addition to receiving historical information. Conventionally, a user may need to check a local newspaper or flyer, or conduct Internet searches in order to compile information regarding current events and topics of local interest. New visitors, unfamiliar with local businesses, may have difficulties locating appropriate entertainment options, creating tours that are consistent with a chosen theme or are appropriate for a particular family or age group.

Location based mobile phone applications should be culturally enriching and provide pertinent and easy access to information, so as to increase visitors to and interest in a neighborhood or location. Therefore, there is a need for an additional mobile device system and application for providing artifact tours.

BRIEF SUMMARY OF THE INVENTION

A location based mobile device system and application for providing artifact tours is described. An illustrative embodiment of an improved location based mobile device artifact tour system includes a mobile device, a location detection system accessible from the mobile device, a wireless communication system accessible from the mobile device, a user interface system informationally coupled to the mobile device, a map interface system accessible from the mobile device, a non-transitory computer readable storage media informationally coupled to the mobile device, the storage media including a program utilizing program functions to transform the storage media and its associated systems into a mobile artifact tour device, the program functions including determining a device location in a geographic region, associating the device location with a set of artifact data and locations, the set of artifact data and locations filtered based on pre-selected user preferences, displaying the set of artifact data and locations on a map of the geographic region, detecting proximity of the mobile device to an artifact in the set of artifact data and locations, and providing multimedia tour information about the proximate artifact on the user interface system, an artifact detection system informationally coupled to an application running from the non-transitory computer readable storage media, and an artifact data source system comprising a database of artifact information informationally coupled to an application running from the non-transitory computer readable storage media.

An illustrative embodiment of an improved location based mobile device artifact tour system includes an artifact data source system comprising a database of artifact information, a computing device coupled to a non-transitory computer readable storage media, the storage media including a program utilizing program functions to transform the storage media and its associated systems into an artifact tour generating device, the program functions including accepting a location in a geographic region, associating the location with a set of artifact data and locations, the set of artifact data and locations filtered based on pre-selected user preferences, displaying the set of artifact data and locations on a map of the geographic region, creating a multimedia tour of the set of artifact data and locations, and storing the multimedia tour in the non-transitory computer readable storage media, an information communication system connecting the computing device to the non-transitory computer readable storage media and the artifact data source system, a user interface system informationally coupled to the computing device, and a map display system coupled to the user interface system, the computing device and the computer readable storage media.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein.

Figure 1C:
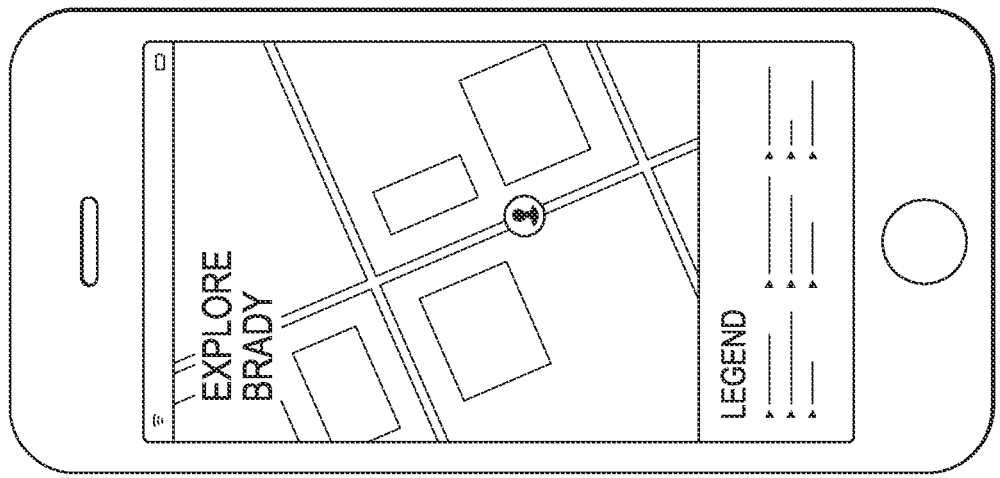
FIGS. 1A-1D are front elevation views of a mobile device with a user interface screen showing an application of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives to such embodiments that fall within the scope of the present invention as defined by the appended claims.

DETAILED DESCRIPTION

A location based mobile device system and application for providing artifact tours will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a selectable icon includes one or more icons.

As used herein the term "tour" refers to a series of location icons and information relating the icon locations to each other such that a user may follow the information to take a self-guided tour of an area of interest, such as a historic district.

As used herein, the term "mobile device" refers to any computer intended to be used away from a permanent location such as an office or desk. Mobile device may refer, for example but not for the purposes of limitation, to a "smart phone," a tablet, a mini-laptop, a laptop, or other similar device containing at least a display and a user input means.

As used herein, the term "location based" refers to services provided to an application on a mobile device that has GPS or similar system capabilities to locate itself on the surface of the Earth with reasonable accuracy. Where the mobile device does not provide GPS type data, or where the data is not available due to a user preference setting, the application may provide the user a request to "turn on location services?" If the user refuses, the application may prompt the user for the zip code of the current location. Zip code data may be provided by the user database engines to identify geographic location and local artifacts.

As used herein, the term Bluetooth refers to a type of communication standard for short-range wireless interconnection of cellular phones, smart phones, computers, tablets and other electronic devices. The term RFID stands for Radio Frequency Identification. RFID is a wireless standard for non-contact use of electromagnetic fields to transfer data. RFID tags may contain electronically stored information. The term "QR code," (Quick Response Code) as used herein, refers to a two dimensional machine readable optical label in the form of a matrix bar code.

As used in this specification and the appended claims, the terms "display," "screen," and "output," refer interchangeably to audio and/or visual information provided to a mobile device user on a mobile device. "Information" refers to textual, pictorial, audio and/or video information.

As used herein, an "artifact" is any item of cultural, historical and/or educational interest relevant to a particular location. For example, but not by way of limitation, an artifact may be a local business (such as a shop, bar or restaurant), a historical landmark, a plant, a geologic formation or geographic feature, a structure, a person with ties to the location, a work of art or other object of interest. As used herein, an artifact is explicitly not limited to man-made items, but may also include naturally occurring objects or persons. In some embodiments, a single artifact may be relevant to a plurality of locations. For example, information related to a particular performer may be tied to a location where the performer has and/or will perform, and also to the location of the performer's birth.

As used in this specification and the appended claims, an "App" refers to a self-contained software program (application program) downloaded by a user to a mobile device and designed to provide location based artifact tours. The terms "user" and "operator" refer interchangeably to a person interfacing with a mobile device. A "user interface" or "operator interface," "human machine interface" (HMI), or "mobile device interface," refer interchangeably to the display of output of information from a mobile device application. A mobile device user or operator may use an application of illustrative embodiments to assist in navigating a neighborhood, locale or particular geography. A mobile device interface may include a color and/or a monochrome output display, as well as a user input interface. The user input interface may comprise a touch screen, switches, keyboard, mouse and/or mechanical buttons to allow the user to input preferences, dates or other parameters.

As used in this specification and the appended claims, "multimedia" refers to audio and/or visual information.

Only non-transitory computer-readable media (storage devices) are within the scope of this application and the appended claims. As used in this specification and the appended claims, non-transitory storage devices comprise all computer-readable media except for a transitory, propagating signal.

As used herein, the term "button" means a selectable, clickable and/or tappable rendered image, region, icon, touch screen button, mechanical button, switch or any combination thereof. As used herein the term "button click"

means a user selection of a button. In a preferred embodiment, the mobile device user interface is a color, touch screen display device. In some embodiments, a color display may be more readily visible in bright light than a monochromatic display, such as in sunlight for outdoor applications. As used herein the term "selection" or "click" is used interchangeably to refer to the action of a user making a selection, speaking a command, or pressing, tapping, or touching a button.

A location-based mobile device system and application for providing a mobile device user with artifact tours and data is described. The mobile device application of illustrative embodiments provides multimedia information regarding one or more artifacts in the vicinity of the mobile device. In addition to landmarks, natural phenomenon, famous persons with ties to the location and age-based activities, an artifact may include both current and historical events. The application of the invention creates and provides "tours" for a location that connects artifacts by a theme. Information relevant to a particular location may be displayed on the mobile device unprompted when the device passes in proximity to a Bluetooth beacon or a beacon employing another wireless technology standard for exchanging data over short distances.

Figure 1B:
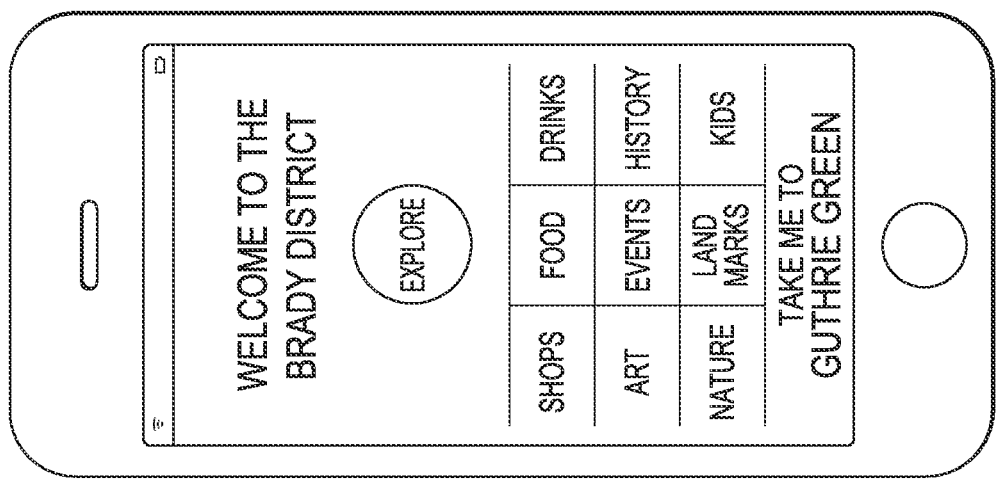
Figure 1A:
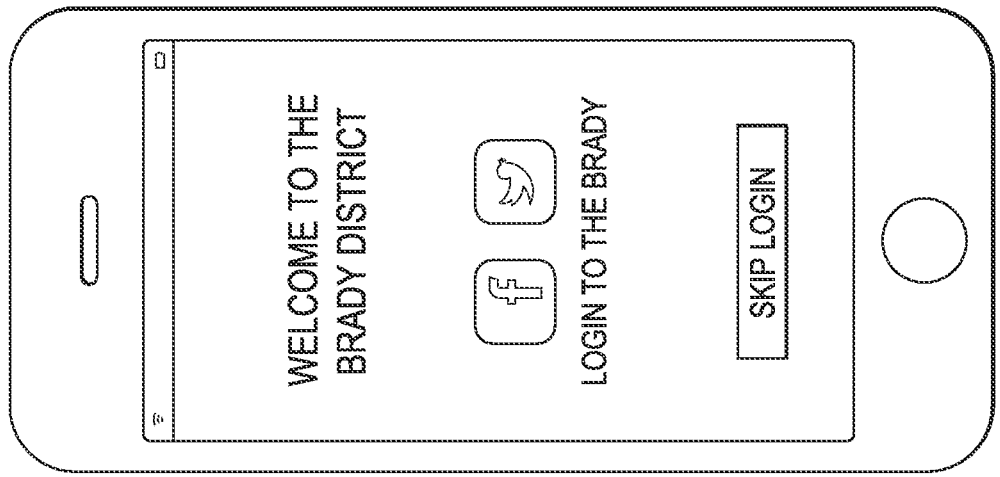

FIGS. 1A-ID illustrate an application of an illustrative embodiment running on a mobile device, such as a smart phone or tablet. The mobile device user may have previously downloaded the application onto the mobile device prior to visiting the location. In some embodiments, a user may receive a text message or other type of prompt to download the application upon entering a location making use of the application or upon purchasing plane tickets to the location. In some embodiments, advertisements regarding the availability of the application may be located at ATMs, gas stations or other areas with high foot traffic. Other alternatives to identify a device's location may include when the mobile device detects a Bluetooth radio signal, when a user scans a QR code displayed on or proximate an artifact of interest, or when a user scans an augmented reality code. In an augmented reality code embodiment, a user may scan or point a mobile device at a computer generated code. The computer generated code may then cause the mobile device to display a 3D image of an artifact, for example, an underground geothermal system (perhaps located below the ground where the user is standing), or a piece of fine art.

Upon starting the application of an illustrative embodiment, the program may first request the location of the mobile device from the device operating system. Mobile devices may use one or more methods to identify the location of the device, including the Global Positioning Satellite (GPS) system or other methods well known to those of skill in the art. The application may use the location coordinates obtained from the device to query one or more databases, search engines, or other information source to associate the device location with a particular neighborhood, district or city line. The location of the device may also be defined in terms of a pre-designated radius about the location of the device. As shown in FIG. 1A, and only for the purpose of an illustrative example, the mobile device has provided the application with location coordinates for an area of Tulsa, Okla., known as the Brady District.

As shown in FIG. 1A, the user is "welcomed" to the location when the application identifies a name for the area of the location of the device. Where the device is located in an area without a neighborhood or other designation, the map coordinates of the location may be used. The user is then provided the option to login to social media to share the location information provided by the application. Users of the application may share images, video or comments, and other information provided by the mobile device and/or application via the standard application interfaces provided by social media accounts, such as Facebook, Instagram or Twitter.

Whether or not the user logs in, a main menu may next be displayed. One exemplary main menu is shown in FIG. 1B. In the example of FIG. 1B, the user may have the option of exploring nearby artifacts of interest by pressing the "Explore" selectable icon/button. In another example, a main menu may include a list and/or map of nearby Places, Stories and Events, which the user may browse and/or filter by category. Categories of Places may include arts and entertainment, food and drink, landmarks, local services, music, nightlife, parks and recreation, shopping and sports. Stories may include articles, stories and detailed information compiled from internet and/or print publications and resources and/or may be original writings. Events may be imported from local newspaper databases and/or other local calendars of events.

In the example of FIGS. 1A-ID, the user has selected the "Explore" function, as shown in FIG. 1C. Upon selecting "Explore," the application requests a map from the mobile device operating system showing the user's current location (the location of the device). While waiting for the map to load, the application may query the Artifact Database to determine if there are any artifacts in the vicinity. Artifacts identified by the Database Query are aligned with the user's selected preferences to determine which artifacts may be of interest to the user. Artifacts of interest may then be displayed to the user on the system map using one or more map icons well known to those in the art of mobile device application programming.

Alternatively, the user may access artifacts of interest based on "Category." The Category option may include modern artifacts such as nearby food services, shopping, notable geologic features, geographic features, flora and fauna displays in addition to or instead of tour artifacts such as historical landmarks, famous walking tours (for example, the Hollywood Walk of Fame), celebrity homes, and must-see artifacts (such as "The World's Largest Ball of String"), all identified based on user preference settings stored by the application. In some embodiments, artifacts may be filtered by Category.

Figure 1D:
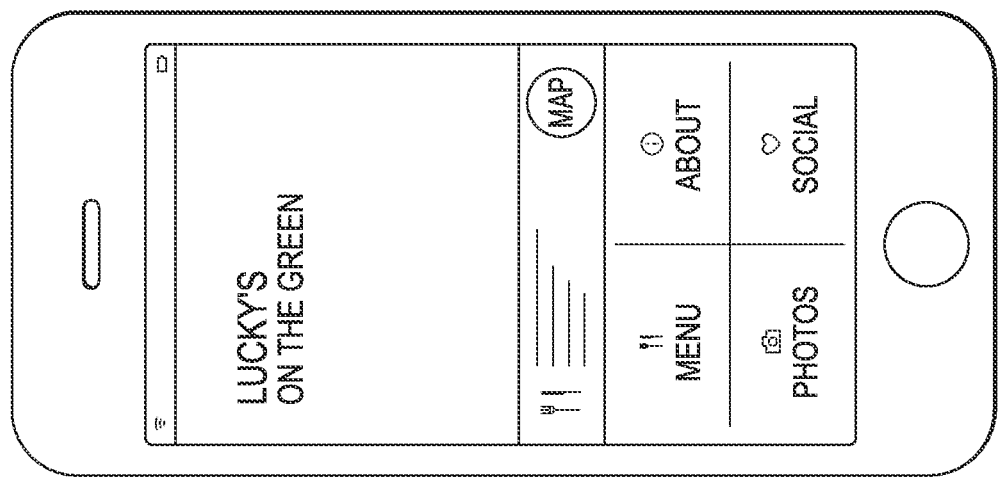

Different Categories of interest may be indicated on the display using different icons. For example, a restaurant may be indicated with a knife and fork icon, a bar with a *martini* glass icon, and so on. As represented in FIG. 1C a list of nearby artifacts by name may also be displayed in addition to the map. If the user desires additional information regarding any of the displayed artifacts, the user simply presses the map icon or name of that item, to display a "detailed artifact" screen. For example, FIG. 1D illustrates where the user has identified the artifact, "Lucky's on the Green" restaurant, and requested detailed artifact information.

The "Detailed Artifact" menu may allow the user to select between photographs of the artifact, in this example a restaurant, information about the restaurant such as address, hours, phone number, menu, a map of the restaurant, restaurant reviews, directions to the restaurant from the user's current location and other related information as stored in the artifact database, or otherwise obtainable by the application.

In some embodiments, upon selecting the "Explore" icon, a user may initiate a self-guided tour of nearby artifacts using the location-based mobile device, as modified by any selected user preferences. The use of user preferences to modify selections may require the user to login to the application in one or more embodiments. In some embodiments, the application may prompt the user to select preferences prior to beginning the tour. For example, the user may indicate that he or she prefers to see historical landmarks. In such an instance, the application may direct the user to nearby historical landmarks in geographical or historical procession starting at the user's present location. Upon arriving at a particular historical landmark, a picture, audio recording, video, text and/or other information detailing the artifact may be displayed without further prompting by the user.

Along the tour and/or while the mobile device is travelling within the geographic region, the mobile device may pass Bluetooth beacons. The Bluetooth beacons may be permanent or temporary and trigger a local song, a video, an audio recording, a picture or other unprompted information to be displayed on the mobile device regarding and/or related to the geography. In instances where beacons are temporary, the location and type of unprompted information provided may vary by day, week or month, continuously providing return visitors with new information. In another example, a Bluetooth beacon located near a local business may push data to a mobile device making use of the application, such as discount information or specials available to users of the application of illustrative embodiments. A user may be provided the opportunity to opt in or out of receiving certain types of pushed data.

In some embodiments, a user may pre-select a tour and tour options prior to entering a location. In such embodiments, the pre-selected tour may be stored, and may, in some embodiments, automatically commence, or automatically request to commence, when the location detection system detects that the mobile device has entered the proximity of the pre-stored tour.

Figure 2A:
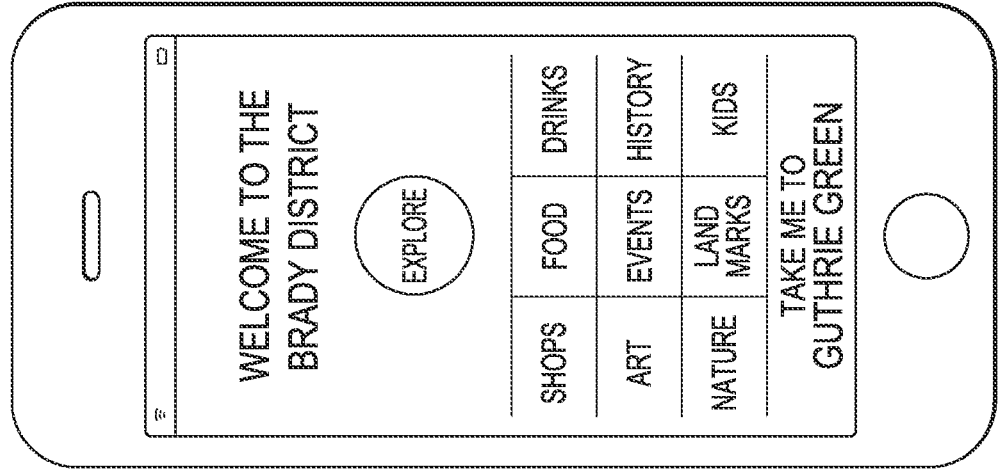
FIGS. 2A-2D are front elevation views of a mobile device with a user interface screen showing an application of an illustrative embodiment.

FIGS. 2A-2D illustrate an alternative example of the application of illustrative embodiments. FIG. 2A illustrates, for example, the main menu for an area entitled, "the Brady District." Should the user wish to leave the Brady District and/or visit a nearby artifact, the user may initiate a new tour by selecting the name of that tour (pre-stored or not), by selecting a Category and/or by selecting the name of the new artifact (including defined or predefined) tours. Selection of another artifact, such as a new tour, "Take me to Guthrie Green", for example, may be accomplished by a button selection, a voice command, or other option as provided by the mobile device. The user may then be provided directions to the Guthrie Green, for example. In some embodiments, the user may indicate whether walking directions, driving directions, or directions making use of public transportation are desired.

Figure 2D:
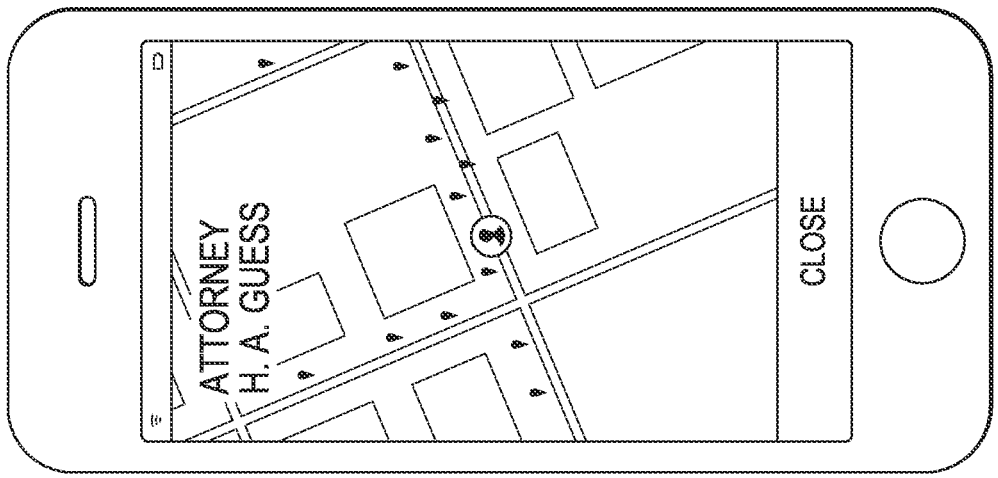
Figure 2C:
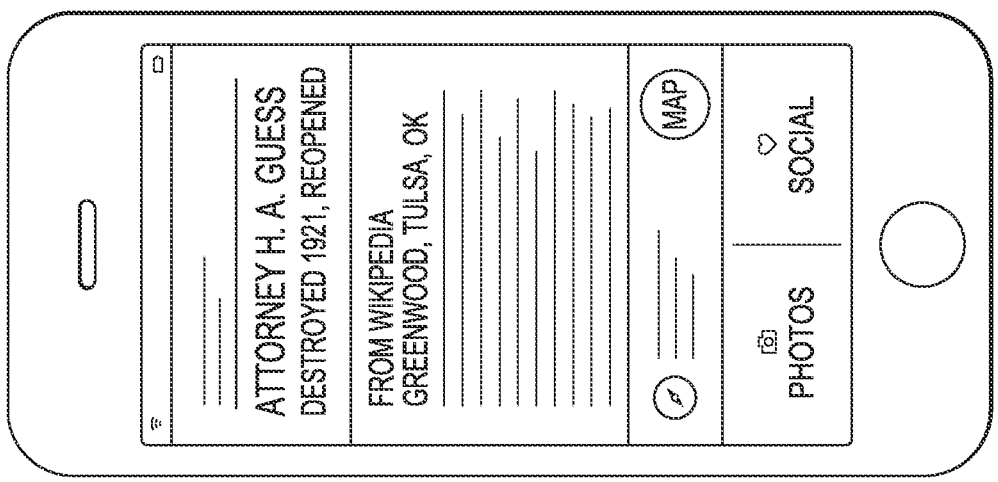
Figure 2B:
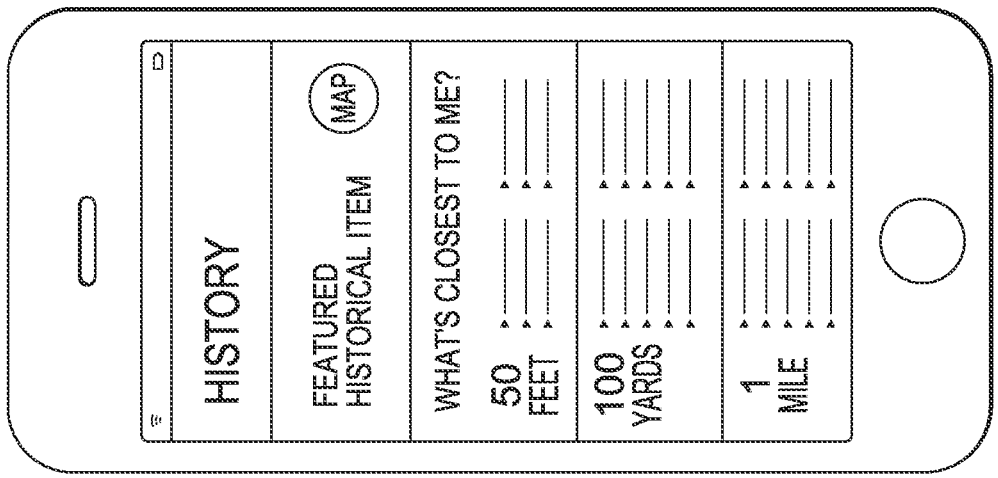

In the case of FIGS. 2A-2D, the user has selected the "History" button on the main menu shown in FIG. 2A, bringing the user to the history screen of FIG. 2B, which history screen displays a variety of historical items in the vicinity of the mobile device. As shown in FIG. 2B, historical landmarks near the mobile device may then be displayed. In some embodiments, the landmarks may be displayed based on their distance from the mobile device's current location. Upon selection of a particular historical landmark, detailed information regarding the selected landmark may be displayed as illustrated in FIG. 2C. In the example of FIG. 2C, detailed information regarding local Attorney H. A. Guess is displayed. In some embodiments, the detailed information regarding an artifact may be displayed unprompted by the user, upon the user's moving into proximity of the artifact. In such instances, the information display may be audio in order to notify the user that a display is about to begin and/or to request whether the user would like the information display to commence. Alternatively, the application may provide an audio warning that visual information is about to be displayed, for example, a "beep", music or spoken words of notice. In some embodiments, once notified that the tour is about to begin, the user may have the option of pausing the tour or commencing the tour. As shown in FIGS. 2C and 2D, if the user presses the "map" icon located on the detailed artifact screen for Attorney H. A. Guess, a map showing the location of Attorney H. A. Guess is displayed.

In another example, a user may select the "Events" icon, tab or link on a main menu screen. In such an example, a list of events occurring in the geographic location of the device over a designated period of time may be displayed, for example, within the next hour, next day or the next week. Events may include concerts, happy hours, lectures, sporting events, or other similar current events. In some embodiments, events may be updated using information, such as an artifact database provided by a local newspaper. In other embodiments, the events may be found in the application's own database of archive items. Events may be displayed in connection with a particular artifact and/or the mobile device may receive notifications of upcoming events in preselected categories of interest. For example, upon opening the detailed information for the BOK Center artifact, a list of upcoming events at the BOK Center may be displayed. Alternatively, if a user indicates that he or she is interested in baseball games, a notification regarding upcoming games near the location, or ticket sales information may be displayed on the mobile device.

In one or more embodiments, the application may be used to obtain tickets or other admission means for local events. Such sales may provide the application developer with a revenue stream by which to fund the application.

Figure 3:
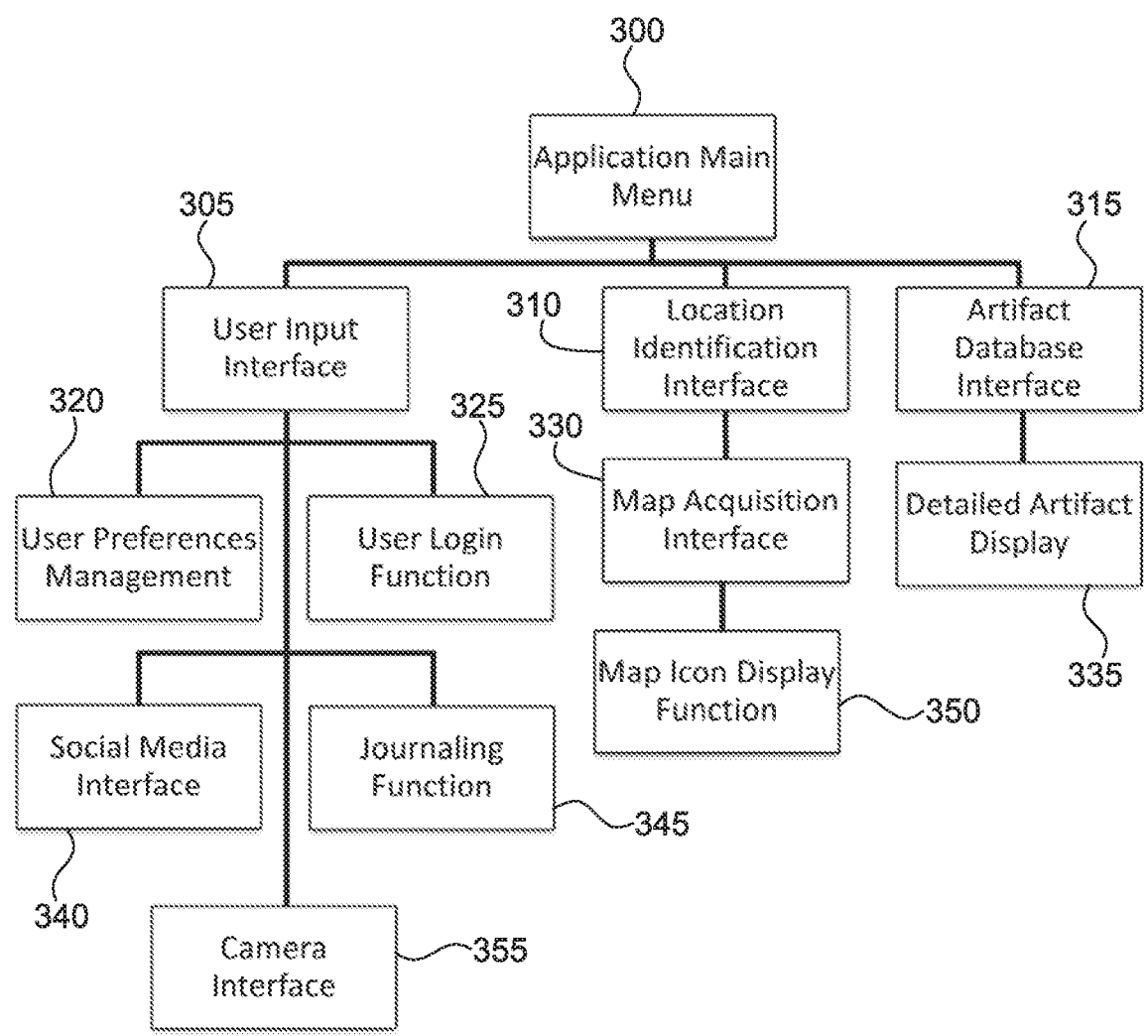
FIG. 3 is a diagram of an architecture system for an artifact tour application of an illustrative embodiment.

FIG. 3 provides a basic architecture diagram for one or more possible embodiments of the invention described herein. The application user interface centers around Application Main Menu 300, an illustrative embodiment of which also shown in FIG. 1B. Application Main Menu 300 may allow the user to access various features or functions of the application such as, for example, the Location Identification Interface 310, the Artifact Database Interface 315 and the User Input Interface 305.

User Input Interface 305 may allow the user to input preferences information (using User Preferences Management function 320), social media login information (for Social Media Interface 340), log into the present application using User Login Function 325, access Journaling Function 345 (in one or more embodiments of the application) to allow the user to capture notes, memories, or other information about the location, and may provide an interface to the mobile device camera using Camera Interface 355.

Location Identification Interface 310 may be used to acquire map data by accessing Map Acquisition Interface 330. Once a map has been obtained from the device operating system, the application may use Map Icon display function 350 to place appropriate icons on the map display.

Appropriate icons for map display may be determined by searching the location coordinates of the mobile device in the Artifact Database using Artifact Database Interface 315. This interface may be accomplished using SQL or other query approach well known to those of skill in the art. Data retrieved from the Artifact Database may indicate the type of artifact identified or located, thereby providing information to the application about which type of icon to use on the map to indicate the type of artifact to the user. When a map icon is selected by the user, the application may access the Detailed Artifact Display function 335 to obtain information and display the information on the screen for the user.

Figure 4A:
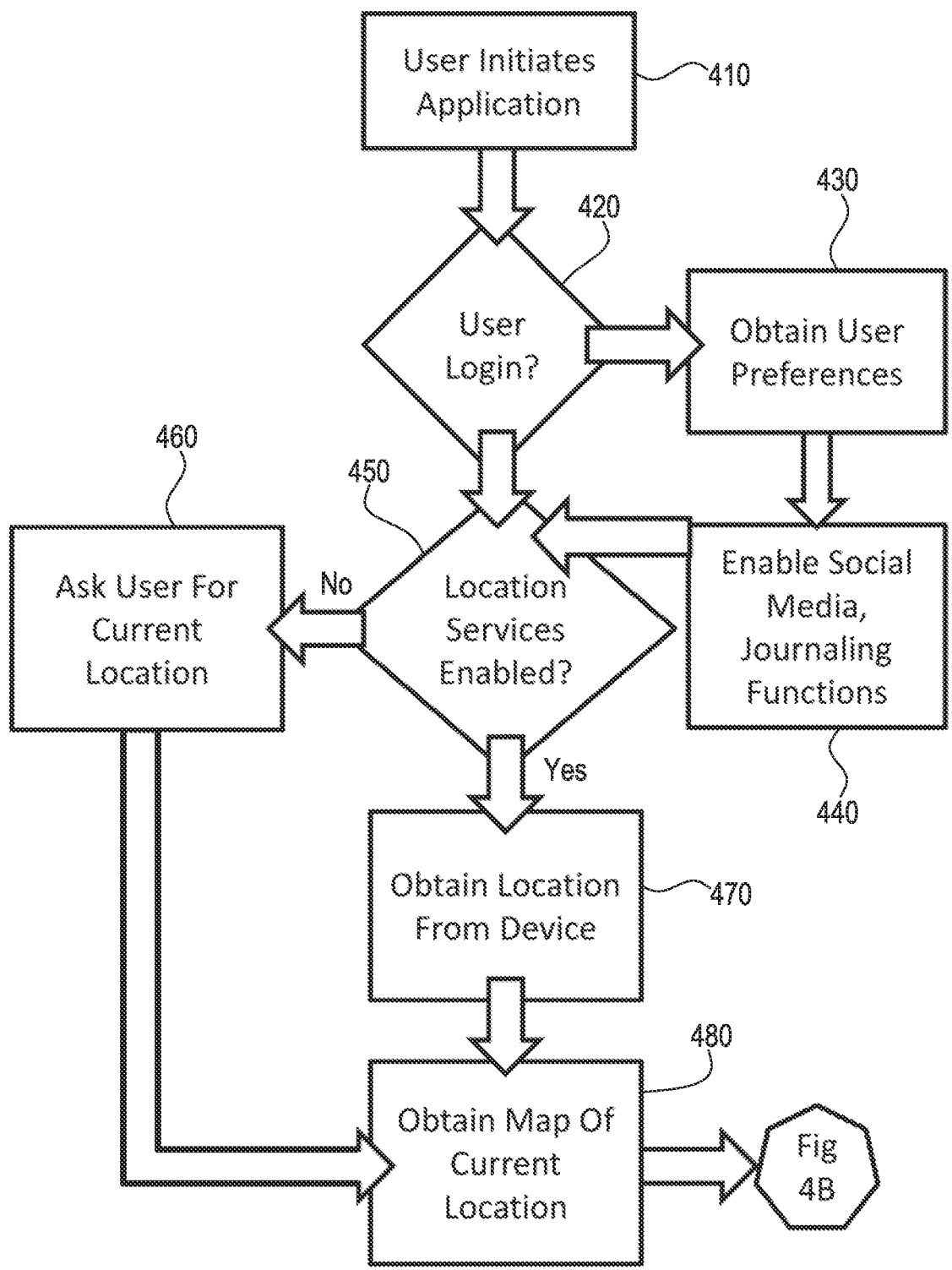
FIGS. 4A-4B is a flowchart of a method of providing a tour of an illustrative embodiment.
Figure 4B:
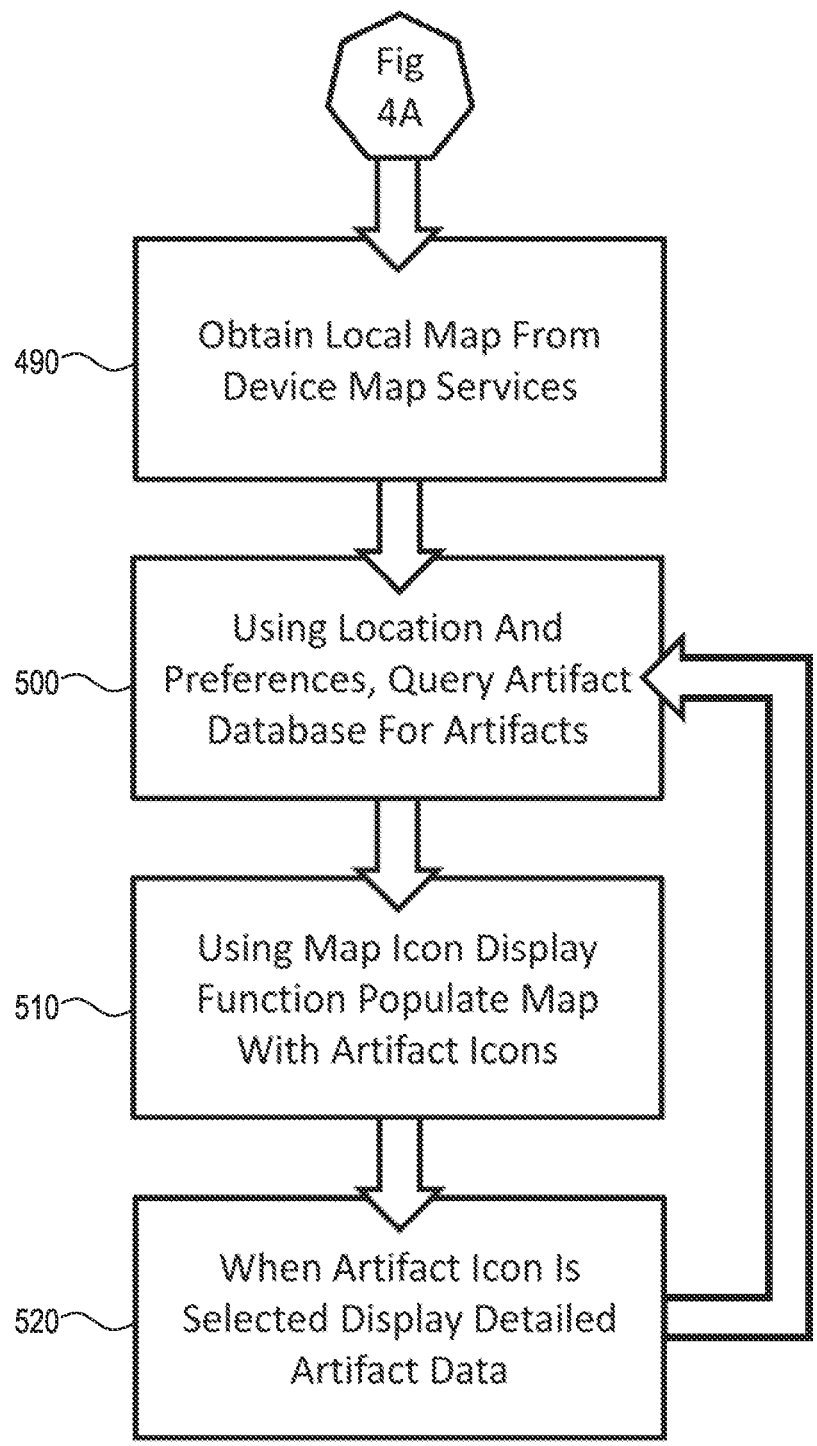

FIGS. 4A and 4B are a flowchart of a method of providing a tour of an illustrative embodiment. The flowchart shown in FIGS. 4A and 4B is provided only to suggest a possible set of steps that may implement all or part of illustrative embodiments. Illustrative embodiments contemplate and may comprise other similar program flows. FIGS. 4A and 4B indicate one method by which an application of an illustrative embodiment may obtain location information, such as a local map and local artifacts, from the device operating system. Once location information is obtained, the application may then inquire about user preferences and query the Artifact Database for additional instructions on which artifacts may be of interest to the user. FIGS. 4A and 4B also indicates an example of the way the application may use location information to query a database for more detailed location and/or artifact data. As shown in FIGS. 4A and 4B, in some embodiments, when an artifact icon is displayed on a map, it may remain inactive unless selected by a user.

In detailed review of FIGS. 4A and 4B, at step 410, the user uses some functions of mobile device 1200 (shown in FIG. 6) to initiate the application. If the user logs in at step 420, user preferences may be obtained at step 430 and social media and journaling functions may also be enabled at step 440. Even if the user fails to or chooses not to login, the flow continues at step 450 to determine access to location services. If location services are not available, the application may ask the user to provide information, such as a zip code, at step 460. If location services are enabled, the application may obtain current location from mobile device 1200 and/or its available devices at step 470. In any case, program flow continues at step 480, where the application may obtain a map of the current location from mobile device 1200 or its associated functions. Flow continues on to FIG. 4B, at step 490, where the application may obtain a local map from the device map services (for example, mapping system 1240).

The application may now enter an operational loop where it uses current location, which may change over time, to query artifact information database 1260 for local artifacts at step 500. At step 510, the application may use a map icon display function well understood by those of skill in the art to display artifact icons on the local map. Step 520 may be implemented in one or more calls to artifact information database 1260 to provide information and access to other functions related to an icon selected by the user. When complete, mobile device 1200 may be moved to another location and the application (tour) flow may return to step 490.

Figure 5:
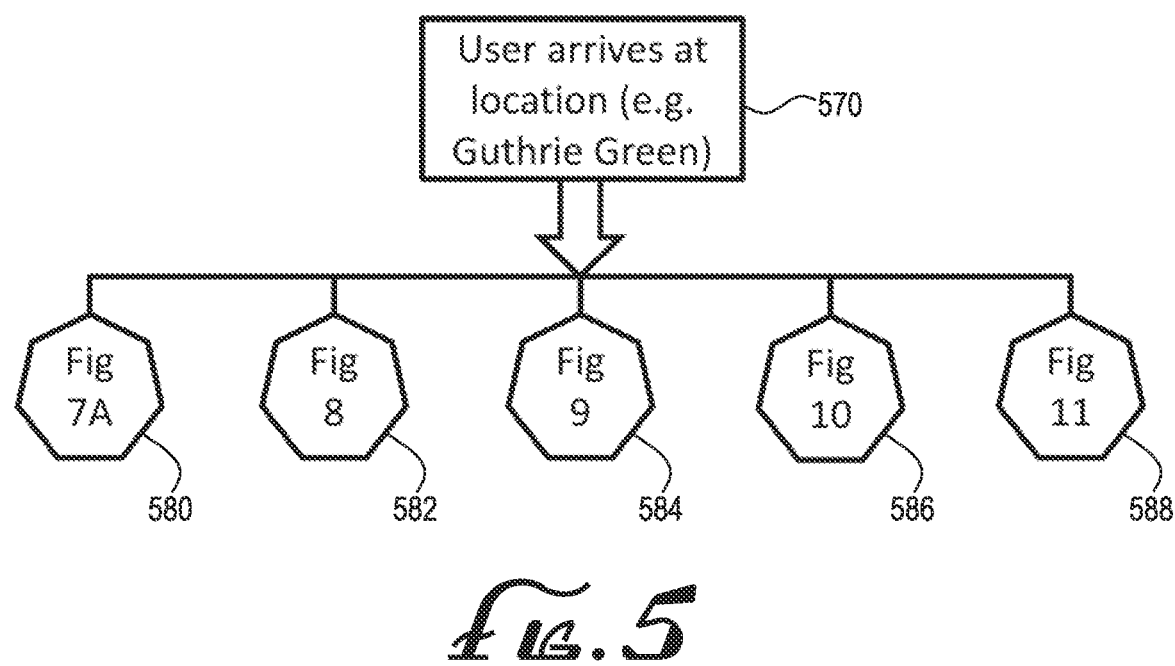
FIG. 5 is a diagram of top-level architecture system for an artifact tour application of an illustrative embodiment.

FIG. 5 is a diagram of top-level architecture system for an artifact tour application of an illustrative embodiment wherein a user arrives at an artifact location 570, such as Guthrie Green described elsewhere herein. Access to various functions of the example application are represented structurally by the choices provided in the example of FIG. 5, including access to software and data described in links 580 (FIG. 7A), 582 (FIG. 8), 584 (FIG. 9), 586 (FIG. 10) and 588 (FIG. 11).

Figure 6:
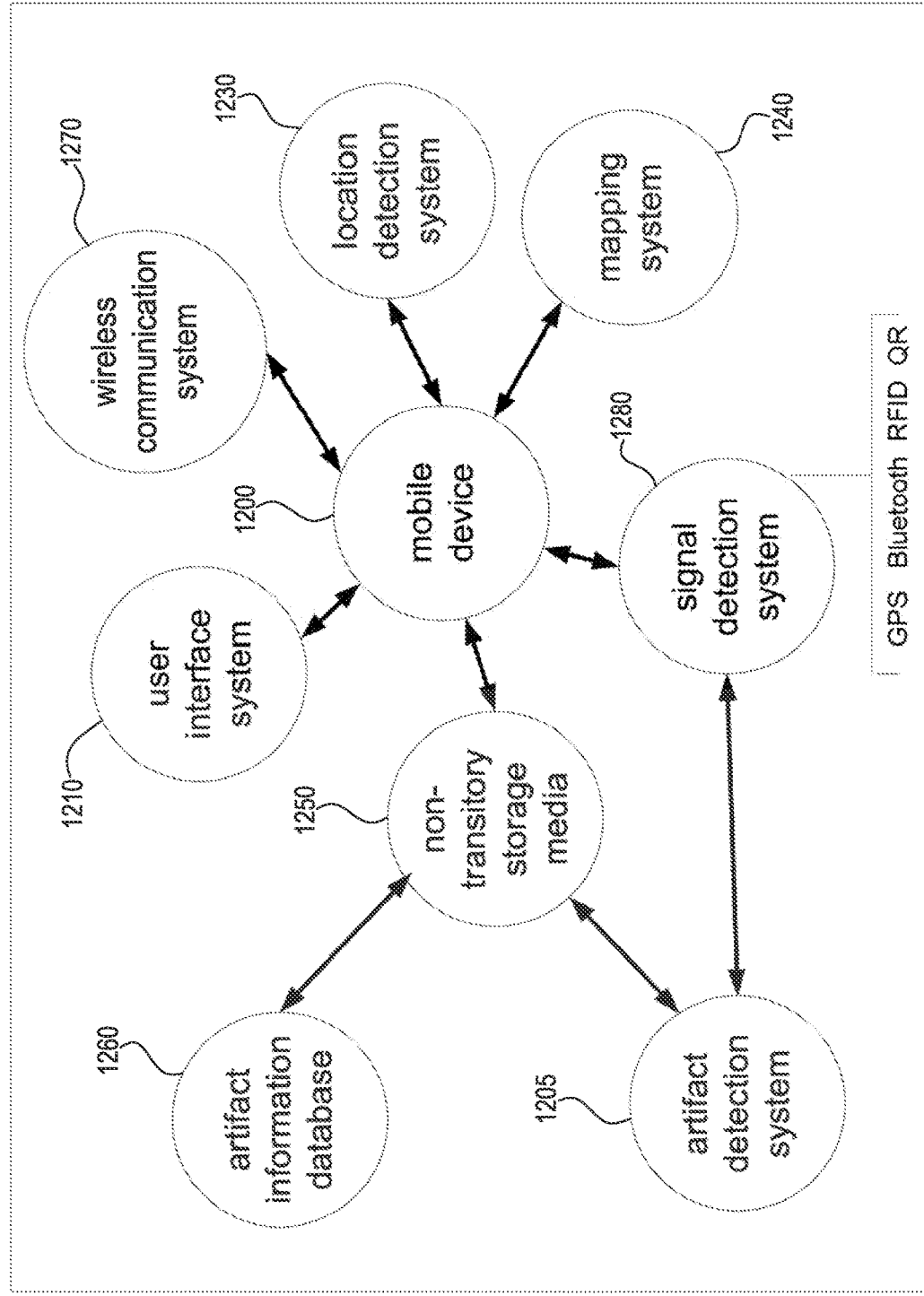
FIG. 6 is a diagram of a bubble chart relating interface functions of an illustrative embodiment of a location based mobile device artifact tour system.

FIG. 6 is a diagram of a bubble chart relating interface functions of an illustrative embodiment of a location based mobile device artifact tour system. Mobile device 1200 may provide various functions to the system well known to those of skill in the art of programming such devices, along with the improvements in function of mobile device 1200 as provided by and/or as modified by illustrative embodiments. User interface system 1210, wireless communication system 1270, location detection system 1230, mapping system 1240, and signal detection system 1280 (including access to GPS, Bluetooth, RFID and QR reader and translation functions) may be represented by functions that may be provided by the hardware and/or operating system of mobile device 1200 to the artifact tour system program instructions stored in non-transitory storage media 1250. In alternative embodiments, one or more of these functions may be provided by the program instructions of illustrative embodiments. Non-transitory storage media 1250 may store the program providing the creation of and access to artifact tours. Non-transitory storage media 1250 may contain a set of executable or interpretable instructions which may be resident in mobile device 1200, as when downloaded, located in a cloud-based computing environment with access through instructions store in non-transitory storage media 1250, or some combination thereof as known to those of skill in the programming arts. Artifact detection system and artifact information database 1260 may be composed in part of program instructions stored and executable from non-transitory storage media 1250, or may be access from such instructions, or a combination of those known to those of ordinary skill in the art of programming.

Artifact detection system 1205 may use a combination of functions of signal detection system 1280 (to locate) and/or location detection system 1230 (to identify) the location of artifacts of interest to the user in the local vicinity of mobile device 1200. These functions may include GPS or Bluetooth beacon detection, as well as RFID detection. The ability to read and decode QR codes scanned by the user at some artifact locations may also be provided by signal detection system 1280, or by some other function of device and software, such as a camera provided by mobile device 1200, to allow the detection and decoding of QR codes.

Artifact information database 1260 is a feature of illustrative embodiments that may reside in part or in whole in non-transitory storage media 1230, or may be located physically in some location external to mobile device 1200. The contents, access provisions, and scope of artifact information database 1260 is described elsewhere herein by this or other label.

Figure 7A:
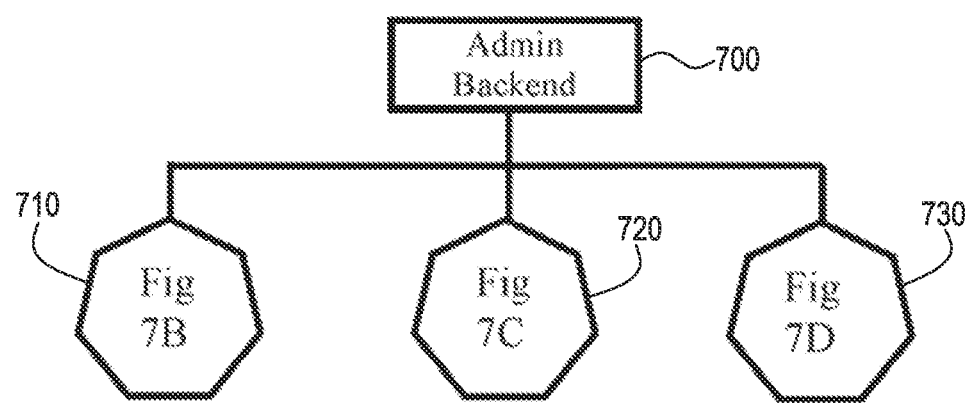
FIGS. 7A-7D are architecture diagrams relating functions and data elements of an administrative backend program for an artifact tour application system of an illustrative embodiment.
Figure 7B:
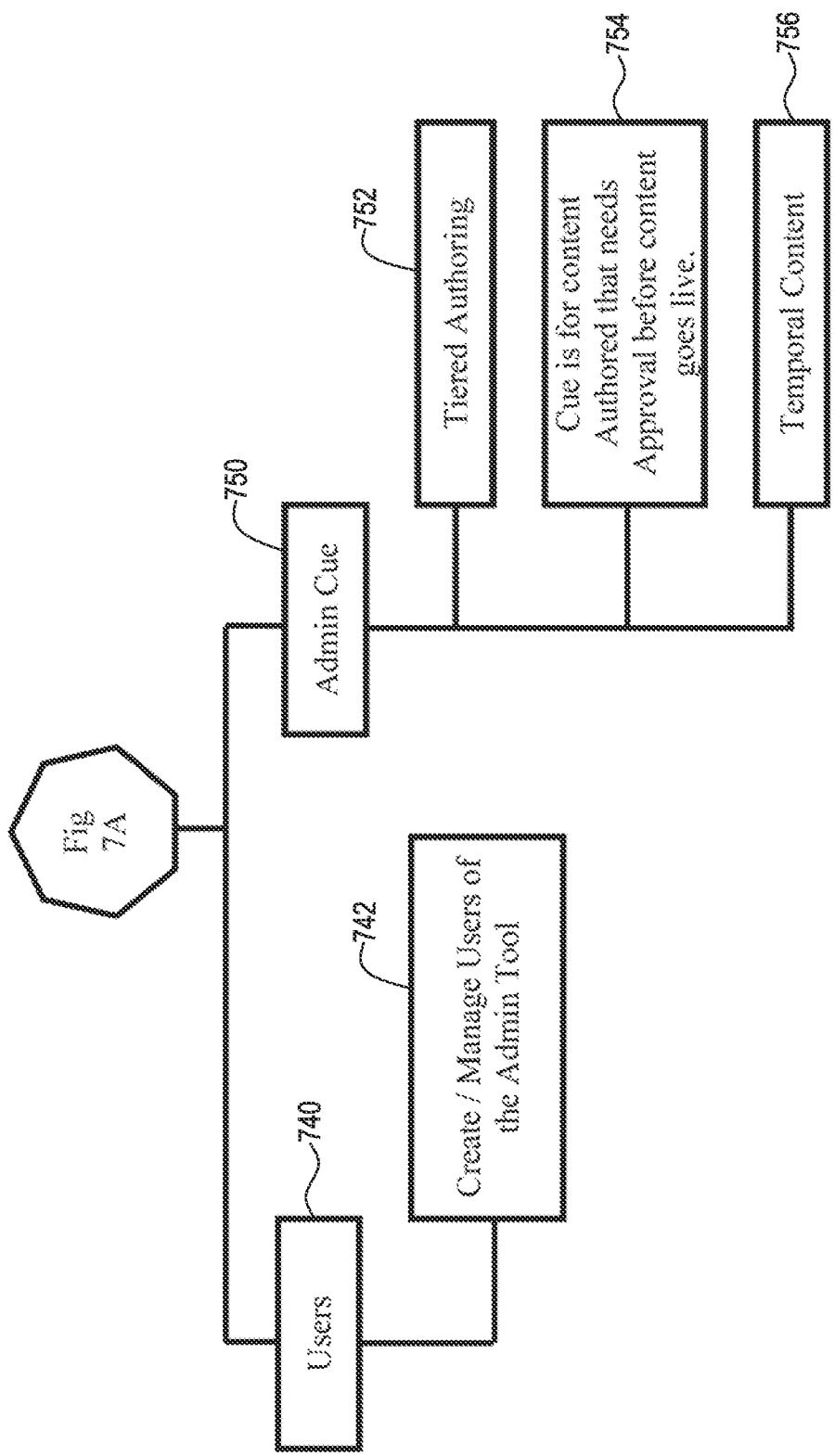

FIGS. 7A-7D are architecture diagrams relating functions and data elements of an administrative backend program for an artifact tour application system of an illustrative embodiment. Item 710 represents functions allowing the administrator to manage users of the application, as shown in FIG. 7B, at item 740. The function of Users 740 may further include the function of creating and managing user accounts for users of the Admin tool, as shown at 742. Administrative Backend 700 may also comprises the function of Admin Cue 750. Admin Cue 750 may be a tiered authoring 752 function for content authoring that needs approval before content "goes live" (is published) 754 for use in the application. The content managed by Admin Cue 750 function may be temporal content 756.

Figure 7C:
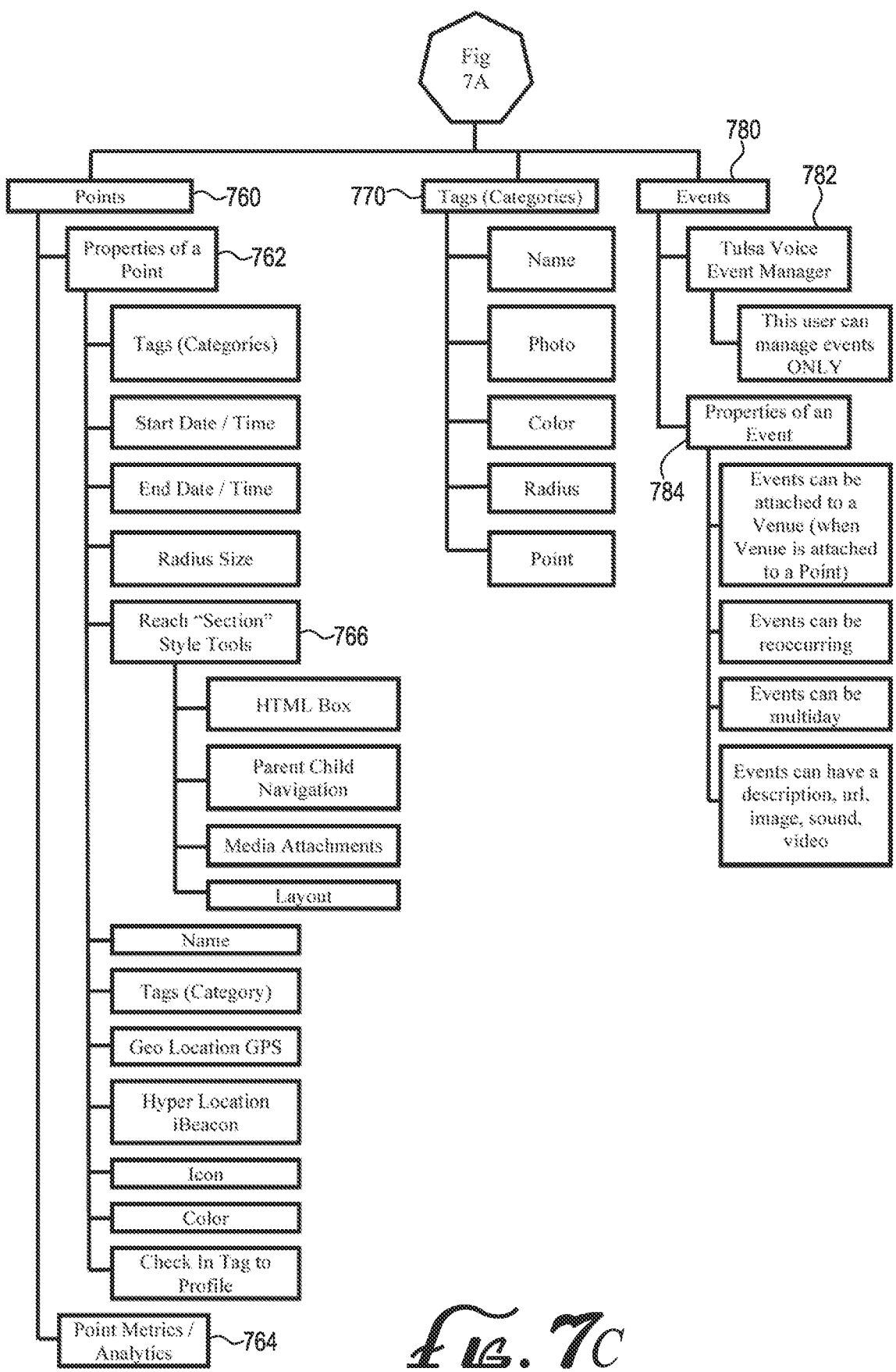

Connection 720 of FIG. 7A leads to FIG. 7C, which may represent various other functions and elements of Admin Backend 700, including Points 760, Tags 770 and Events 780. Point 760 comprise various properties 762 including tags 770, start date/time, end date/time, radius size, and reach "section" style tools 766, name, tags, geo location GPS, hyper location iBeacon, icon, color, check in tag to profile, and point metrics/analytics 764.

Tags 770 may be made up of name, photo, color, radius and point information. Events 780 may be made up of Properties 784 such as being attached to a venue, recurring, and multiday. Other Properties 784 of events 780 may include description, URL, image, sound and/or video. Some admin users may have access to particular Event Managers, such as for example Tulsa Voice Event Manager 782, which may be an event manager associated with a local newspaper or magazine (in this example, the Tulsa Voice). Thus, the event manager may provide a dynamic tour that will vary from one day to another, even for the same user with the same preferences selected.

Figure 7D:
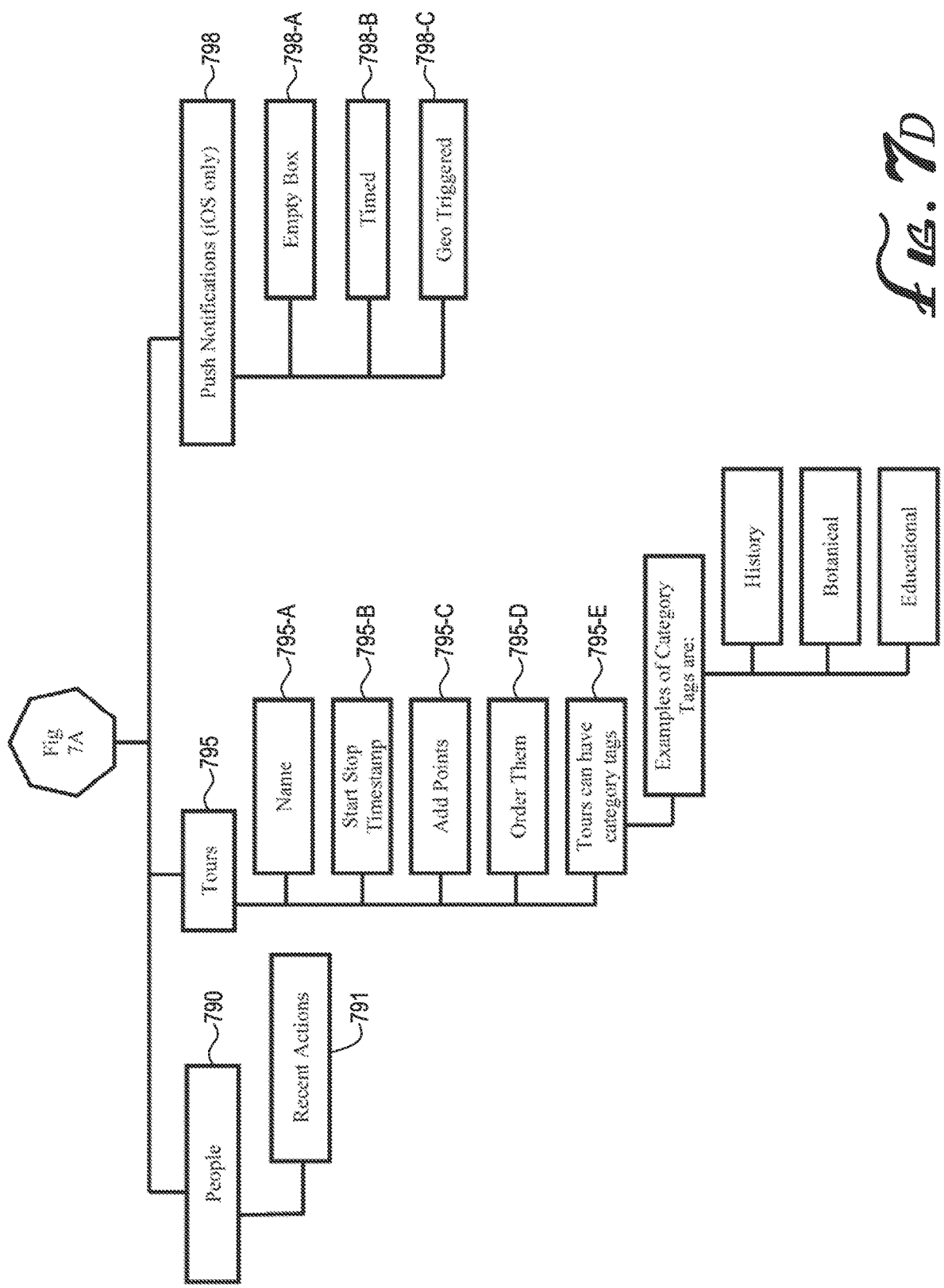

Admin Backend 700 may also provide access to functions such as those illustrated in FIG. 7D through connection 730. Functions illustrated in FIG. 7D include People 790 (maintaining recent actions 791), tours 795 (further comprising elements such as name 795-A, Start-Stop timestamp 795-B, Adding points to tours 795-C, ordering points 795-D, and adding category tags 795-E to tours 795. Category tags 795-E may contain information such as the history, botanical interest information, geologic information and/or educational information related to a particular tour 795.

One or more embodiments of the mobile device application may include the ability to generate or process Push Notifications 798. A given embodiment may include such a function for a given operating system, such as the illustrated embodiment of iOS for Apple mobile devices. Push notifications are information that is provided to the user without direct user query. For example, when passing by a particular geographic ("geo") location, a Bluetooth beacon may provide information to the application that indicates the presence of a given monument (geographically triggered) that was not part of a prior arranged tour. If a user creates a theme organized tour, for example, a given monument may be outside the realm of the theme, but a user may wish to be notified of it when passed just because it is such a famous landmark. Push notification 798 may provide such a function to the user. Push Notifications 798 may be made in Empty Box 798-A, as a timed notification 798-B, or as a geographically triggered notification 798-C, among other options known to those skilled in the art.

Figure 8:
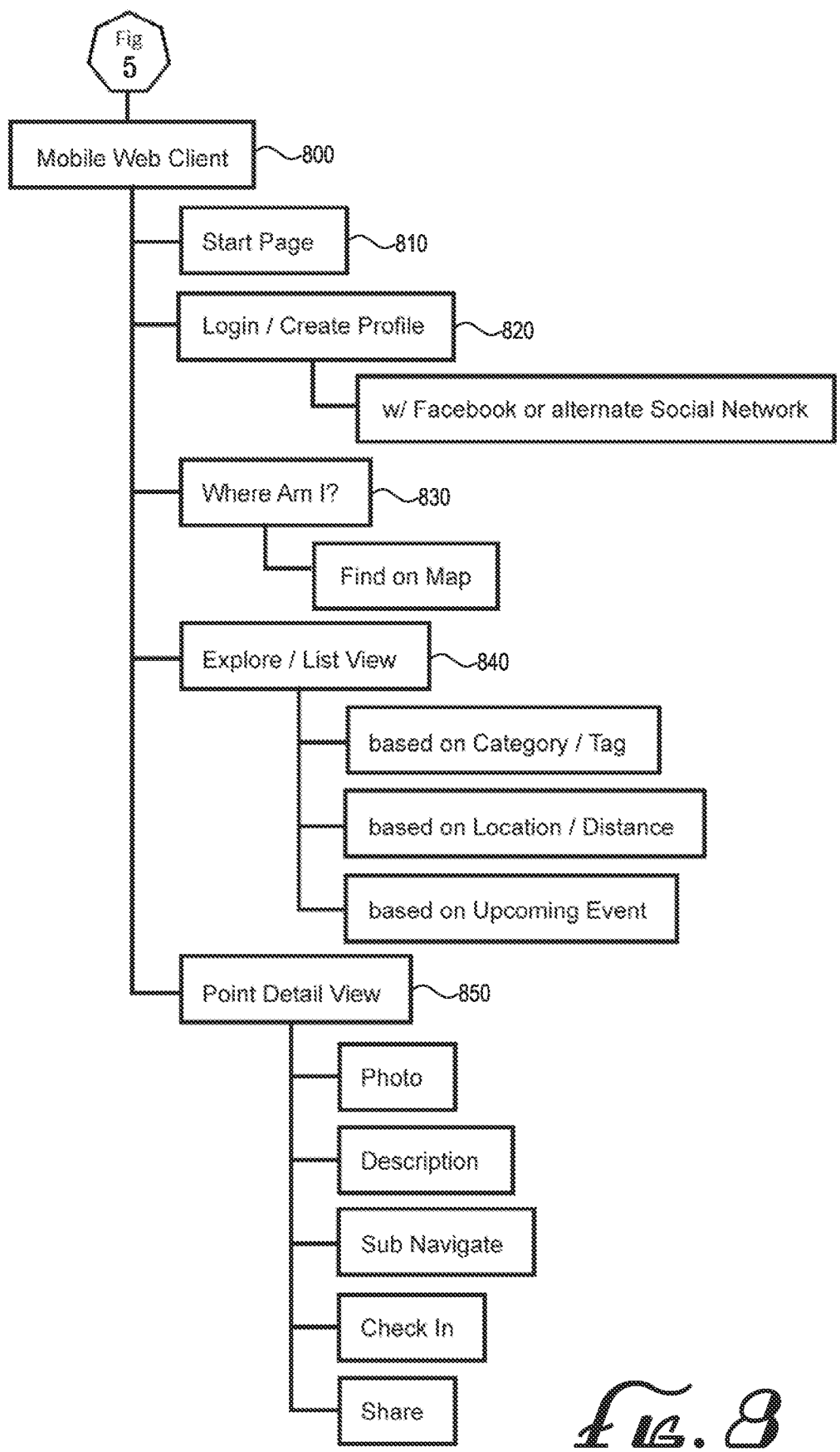
FIGS. 8 and 9 illustrate two alternative embodiments of an artifact tour application system.

FIG. 8 illustrates an exemplary architecture for a mobile web client 800 that could serve side by side with the application of illustrative embodiments. Mobile web client 800 may provide other means for a user to access the functions of the application other than a downloaded and installed program. A mobile web client may run under the browser program of a smart phone, or may also allow a user to access the application and its functions from a computer, tablet or other device that has an Internet connection. Mobile Web Client 800 may have the following functions and features in one or more embodiments of the application: start page 810, Login/Create profile 820, Where am I? 830, Explore/List view 840 and Point Detail View 850.

Figure 9:
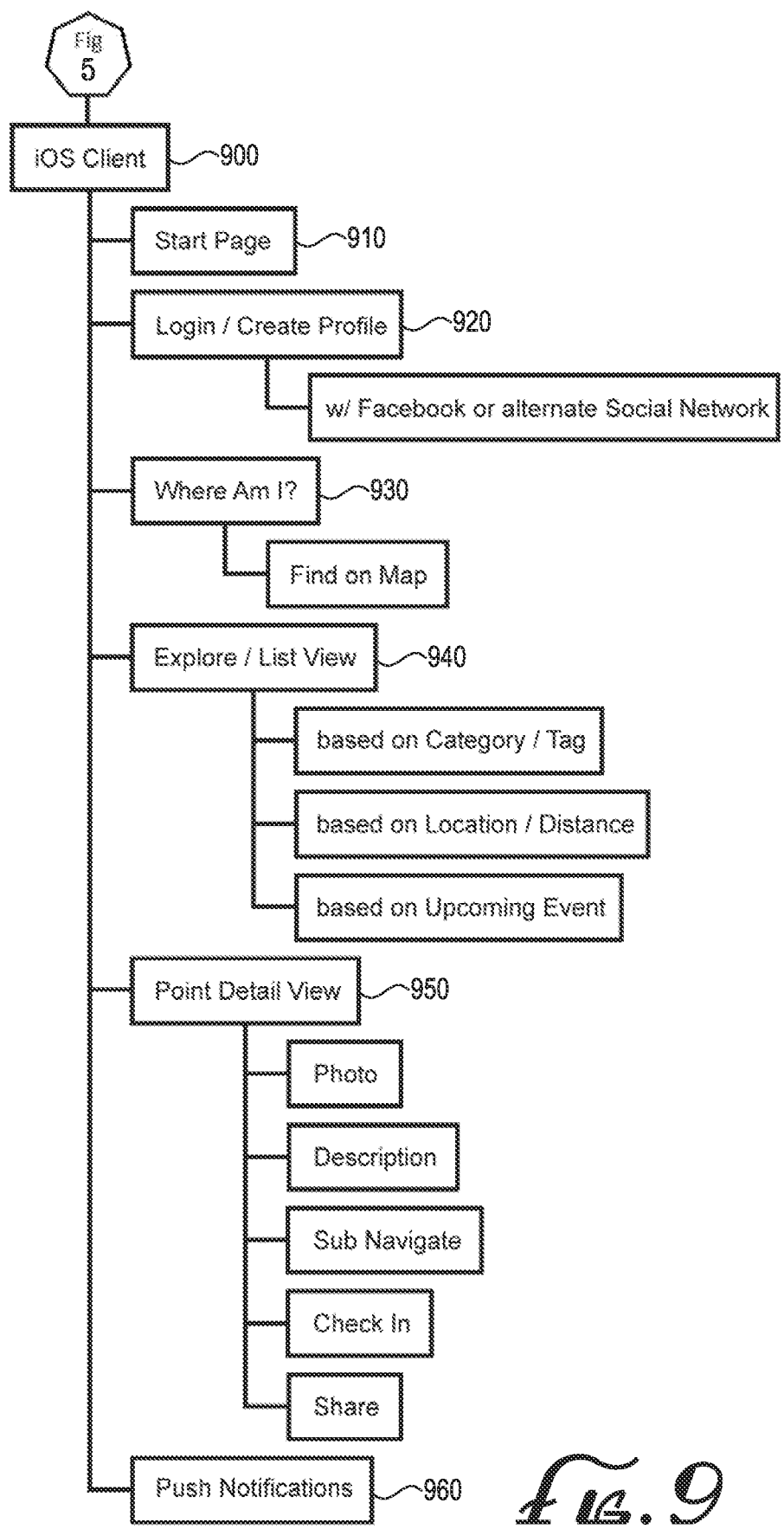

FIG. 9 provides an exemplary architecture for a mobile device based client for an illustrative embodiment of an application described herein. While illustrative embodiments contemplate success on many different platforms, an iOS client (running for example the Apple mobile device Operating Systems iOS), is an exemplary mobile client. iOS client 900 may include iOS start page 910, iOS login/create profile 920, iOS "where am I?" function 930, iOS explore/list view 940, iOS point detail view 950, and iOS push notification 960.

Figure 10:
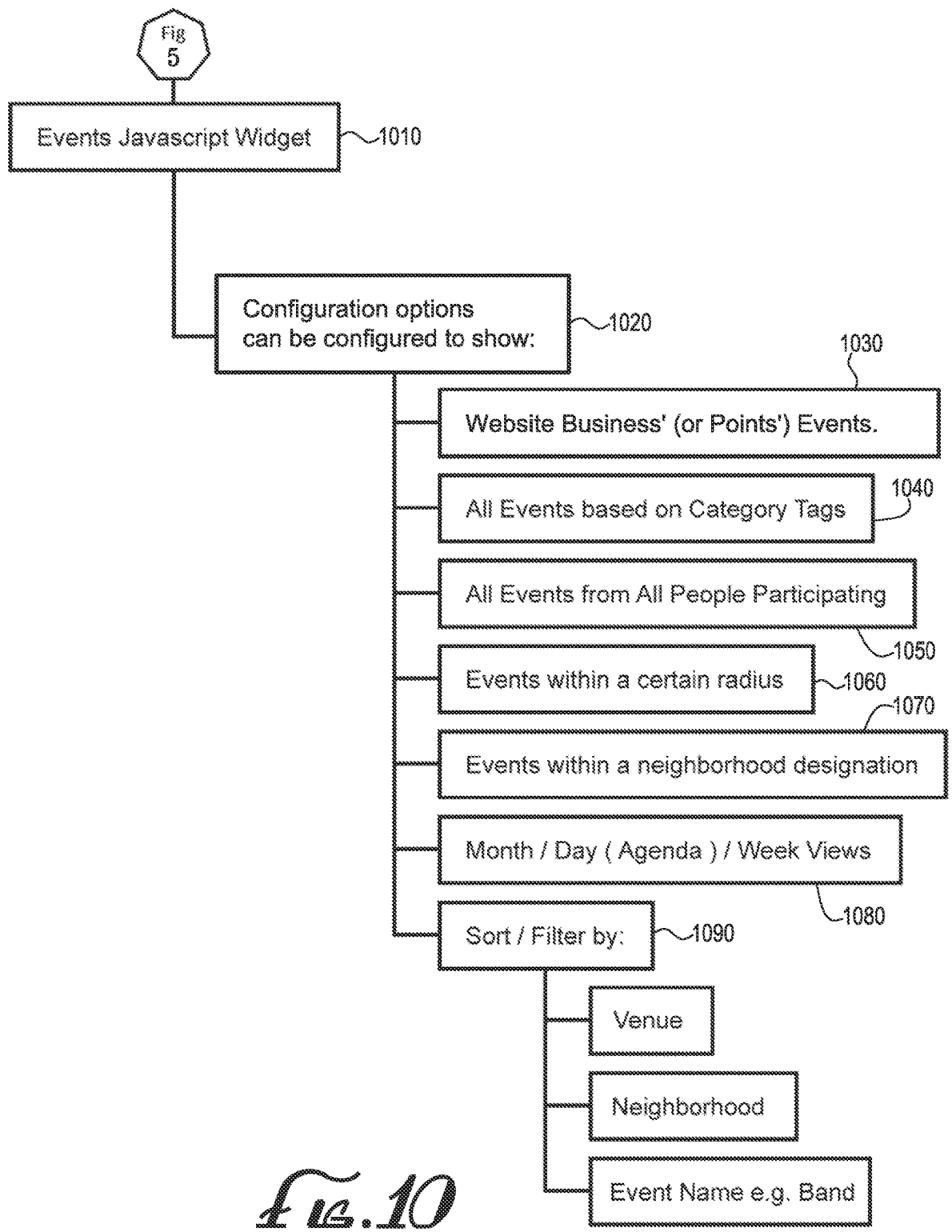
FIG. 10 illustrates an illustrative embodiment of a Javascript widget for configuring application options for an artifact tour application system.
Figure 11:
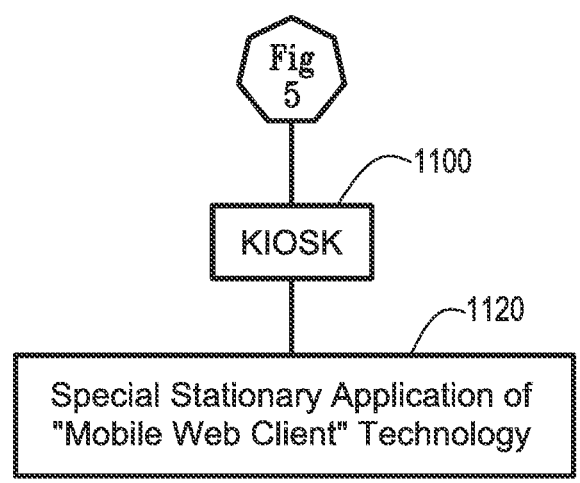
FIG. 11 illustrates the architectural interface between the exemplary example of FIG. 5 and a kiosk embodiment.

FIG. 10 indicates an illustrative embodiment of events Javascript widget 1010. A software widget, as known to one of ordinary skill in the art, is typically a library function created to work with a graphic user interface (GUI) to provide an application with a particular functionality. Events Javascript Widget 1010 may be created with various configuration options 1020. Options may, for example, include points for patronizing a particular business' website at 1030, configured to produce all Events 780 that match a particular category tag 770 option 1040, all Events 780 selected by all users participating in a particular tour 1050, all Events 780 within a certain radius 1060 of a mobile device, all events within a neighborhood designation 1070, all Events 780 based on date 1080, and/or sorted by filter 1090 such as by venue, neighborhood and/or event name (for example, a particular band playing a concert).

FIG. 11 illustrates the architectural interface between the exemplary example of FIG. 5 and a kiosk embodiment. FIG. 11 shows Kiosk 1100, where an alternative embodiment of mobile web client 800 may reside. In a kiosk 1100 example, a stationary mobile web client application 800 may be created to provide users a fixed location to try, learn about, use, or otherwise interact with the application of illustrative embodiments. Such a kiosk 1100 may be located at or with various famous landmarks, events, or other artifacts. Kiosk 1100 may communicate with mobile device 1200 and/or application program instructions using one or more of any type of interface provided by mobile device 1200, such as signal detection system 1280, cellular data communication (not shown) or wireless communication system 1270. In one or more embodiments, a user may encounter kiosk 1100 at an event or artifact location. After trying the application at kiosk 1100, the user may be able to use kiosk 1100 to download the mobile device tour application to the non-transitory storage media 1250 accessible to mobile device 1200, using any known communication medium such as for example wireless communication system 1270, or Bluetooth communication as detected by signal detection system 1280, of mobile device 1200. Such an interface accompanying kiosk 1100 may be an advantage because some users may not have enabled cellular data download on a mobile device, yet while at an event may be otherwise out of range of a known and trustworthy wireless system.

Other functions and functional flows of operation may occur in one or more illustrative embodiments. Those described herein are for the purpose of illustration only and do not constitute the invention as a whole.

The following section provides support for various computer architectures that may support some embodiments of computer program applications of the type described herein. The architecture description is provided to support the application and in no way intended as a limitation on the claims of this invention.

Computer System Architecture and Support

The methods, apparatus and systems described herein are not limited as to the type of computer that may be used to implement the mobile device application of illustrative embodiments. Illustrative embodiments of the kiosk 1100 embodiment (FIG. 11) and events Javascript widget 1010 (FIG. 10) may be implemented and/or run on any computing device with the computational ability to perform and display the results of the application contemplated herein. Such a computing device may typically include a keyboard, touch screen or means for user input or selections (such as a touch-screen keyboard or touch screen buttons), physical buttons, pointing input device (such as a mouse), a display device such as a monitor, or any appropriate combination of input and output devices. The contemplated computing device may also typically comprise a memory, a read only memory (such as a random access memory), a central processing unit and a storage device such as a hard disk drive (either local or remote and physically or logically coupled to the computing device.) In some embodiments, the computing device may also comprise a network connection that allows the computer to send and receive data through a computer network such as the Internet. Mobile computer platforms such as cellular telephones, smart phones, Personal Desktop Assistants (PDAs), kiosks, set top boxes, games boxes or any other computational devices, portable, personal or otherwise, may also qualify as a computing device capable of performing the methods described herein.

Illustrative embodiments may be implemented as a method, apparatus, or article of manufacture using programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the programming is implemented also encompasses transmission media, such as the network transmission line and wireless transmission media. Thus, the article of manufacture also comprises the medium in which the code is embedded. Those skilled in the art will recognize that many modifications may be made to this configuration to implement such a system without departing from the scope of illustrative embodiments described herein.

Elements of the system as described above may comprise software that may execute on one or more computing devices having a computer usable memory medium (or a computer readable memory medium) and computer readable program code. The computer readable program code may include an input function, user interface functions and an output means such as a computer display, audio output, and/or printing output.

Furthermore, illustrative embodiments may be implemented as a program of computer-readable instructions and/or computer-readable data stored on a computer-readable medium. Programs, data and other information may constitute, but are not limited to, sets of computer instructions, code sequences, configuration information, and other information in any form, format or language usable by multiple types of computer or other processing devices, such that when such a computer contains, is programmed with, or has access to the programs, data and other information the computer is transformed into a machine capable of performing the application functions, such as those described above. A computer-readable medium suitable to provide computer readable instructions and/or computer readable data for the methods and processes described herein may be any type of magnetic, optical, or electrical storage medium including a disk, tape, CD, DVD, flash drive, thumb drive, storage card, or any other memory device or other storage medium known to those of skill in the art.

In one or more embodiments of the invention, the method(s) described herein, when loaded on or executing through or by one or more computer(s) described above, may transform the computer(s) into a specially programmed computer device able to perform the method or methods described herein and/or a system with improved function. In one or more illustrative embodiments, the non-transitory computer-readable storage medium(s) encoded with computer program instructions that, when accessed by a computer, may cause the computer to load the program instructions to a memory there accessible, thereby creates a specially programmed computer able to perform the methods described herein and/or a system with improved functionality.

The specially programmed computer of illustrative embodiments may also comprise a connection that allows the computer to send and/or receive data through a computer network such as the Internet or other communication network. Mobile computer platforms such as cellular telephones, Personal Desktop Assistants (PDAs), other handheld computing devices, digital recorders, wearable computing devices, tablets, kiosks, set top boxes, games boxes or any other computational device, portable, personal, real or virtual or otherwise, may also qualify as a computer system or part of a computer system capable of executing the methods described herein as a specially programmed computer.

Computer systems as described in this section are well known to those of ordinary skill in the art and are therefore not further described or illustrated herein.

Illustrative embodiments may be configured to enable the specially programmed computer of illustrative embodiments to take the input data given and transform it into a form usable by a system implementing a location based mobile device system and application for providing artifact tours by applying one or more of the methods and/or processes of illustrative embodiments as described herein. Thus, the methods described herein are able to transform operator selections using the system of illustrative embodiments to result in an output of the system such as a display of maps and/or artifact information.

Thus, the mobile device application of one or more embodiments of the invention provides a flexible and friendly, portal to inform visitors and residents of a geographic location of current and historical events that have or will take place in the location, and persons or objects of interest. Information regarding local businesses, architecture, natural phenomenon and horticulture and famous persons associated with the region may also be displayed. In some embodiments, the application of illustrative embodiments may enrich a user's knowledge of a location, thereby promoting local business and encouraging tourism to the neighborhood. In some embodiments, tours may be automatically generated, which offer directions to and information regarding artifacts in succession based on one or more of a location of the mobile device, a subject of interest (such as historical monuments or natural phenomenon), and/or the age of the user (such as child friendly activities). Current events, such as musical concerts, parades, sporting events, happy hours, and other time sensitive information may also be easily accessible. Beacons may also be dispersed about a location to provide unprompted information when a user passes in proximity to the beacon.

While the invention herein disclosed has been described by means of specific embodiments and applications thereof, numerous modifications and variations could be made thereto by those skilled in the art without departing from the scope of the invention set forth in the claims. The embodiments described above are therefore considered in all respects to be illustrative and not restrictive. The scope of the invention is indicated by the appended claims, and all changes that come within the scope and range of equivalents thereof are intended to be embraced therein.

What is claimed is:

1. An improved location based mobile device artifact tour system comprising:
   a mobile device;

a location detection system informationally accessible from the mobile device;

a wireless communication system informationally accessible from the mobile device;

a user interface system informationally accessible to the mobile device;

a map interface system informationally accessible from the mobile device;

a computer program utilizing program functions, the computer program functions comprising:
  determining a device location in a geographic region;
  associating the device location with a set of artifact data and locations;
  displaying the set of artifact data and locations on a map of the geographic region;
  detecting proximity of the mobile device to an artifact in the set of artifact data and locations; and
  providing multimedia tour information about the proximate artifact on the user interface system;

an artifact detection system informationally accessible to the computer program; and an artifact data source system comprising a database of artifact information informationally accessible to the computer program, the database comprising a current event occurring within the geographic region;

wherein the current event occurs within a designated time of the providing of the multimedia tour information on the mobile device, and wherein a notification of the current event is displayed on the user interface system when the mobile device is in proximity to a location of the current event.

2. The system of claim 1 wherein the set of artifact data and locations are filtered based on pre-selected user preference, and further comprising program functions for setting the pre-selected user preferences.

3. The system of claim 1 further comprising a revenue-stream generating push-data function.

4. The system of claim 1 further comprising an auto-start function associated with a previously stored artifact tour.

5. The system of claim 1 further comprising an events function that provides details of the current event.

6. The system of claim 5 wherein the events function further provides access to ticket purchase to the current event.

7. The system of claim 5 further comprising a reservations function providing access to artifact tour associated event reservations.

8. The system of claim 1 further comprising a journaling function associated with an artifact tour.

9. The system of claim 8 further comprising an interface between the journaling function and a social media account.

10. The system of claim 1 further comprising a Bluetooth beacon providing unprompted information to be displayed in addition to the selected artifact tour.

11. An improved location based mobile device artifact tour system comprising:

an artifact data source system comprising a database of artifact information, the database comprising a current event occurring within a geographic region;

a computing device comprising a computer program utilizing computer program functions, the computer program functions comprising:
  accepting a selection of a subject of interest located in the geographic region;
  associating the subject of interest with a set of artifact data and locations;
  displaying the set of artifact data and locations on a map of the geographic region;
  creating a multimedia tour of the set of artifact data and locations; and
  storing the multimedia tour in a non-transitory computer readable storage media coupled to the computing device;

an information communication system connecting the computing device to the non-transitory computer-readable storage media and the artifact data source system;

a user interface system informationally coupled to the computing device;

a map display system coupled to the user interface system, the computing device and the computer-readable storage media; and wherein notification of the current event is displayed on the user interface system when proximity of the computing device to a location of the current event is detected by the computer program, and wherein the current event occurs within a designated time of the mobile device proximity so detected.

12. The system of claim 11 further comprising computer program functions for setting the subject of interest.

13. The system of claim 12 wherein the subject of interest comprises a theme.

14. The system of claim 13 wherein the theme comprises artifact information associated with a famous person.

15. The system of claim 14 wherein the famous person comprises a contemporary performer.

16. The system of claim 13 wherein the theme comprises artifact information associated with a historic event.

17. The system of claim 13 wherein the theme comprises artifact information of age-based activities.

18. The system of claim 13 wherein the theme comprises artifact information associated with landmarks.

19. The system of claim 13 wherein the theme comprises artifact information associated with current events.

20. The system of claim 13 wherein the theme comprises artifact information associated with historical events.

* * * * *